United States Patent
Zhao et al.

(10) Patent No.: US 11,410,089 B2
(45) Date of Patent: Aug. 9, 2022

(54) DYNAMIC BOOKING SYSTEM FOR SHARED DOCKLESS BIKES USING TRAJECTORY POSITION

(71) Applicant: INTERNATIONAL BUSINESS MACHINES CORPORATION, Armonk, NY (US)

(72) Inventors: Shiwan Zhao, Beijing (CN); Changhua Sun, Beijing (CN); Ke Ke Cai, Beijing (CN); Li Zhang, Beijing (CN); Honglei Guo, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 781 days.

(21) Appl. No.: 16/117,740

(22) Filed: Aug. 30, 2018

(65) Prior Publication Data

US 2020/0074351 A1 Mar. 5, 2020

(51) Int. Cl.
*G06Q 10/02* (2012.01)
*G07C 11/00* (2006.01)

(52) U.S. Cl.
CPC ......... *G06Q 10/02* (2013.01); *G07C 2011/04* (2013.01)

(58) Field of Classification Search
CPC .... G06Q 10/02; G06Q 50/30; G07C 2011/04; G07F 17/0057
See application file for complete search history.

(56) References Cited

U.S. PATENT DOCUMENTS

| | | | | |
|---|---|---|---|---|
| 2015/0161752 | A1* | 6/2015 | Barreto | G06Q 10/063114 705/7.15 |
| 2016/0321771 | A1* | 11/2016 | Liu | G01C 21/3438 |
| 2016/0364812 | A1* | 12/2016 | Cao | G06Q 50/30 |
| 2018/0286003 | A1* | 10/2018 | Zhang | G06Q 10/063114 |
| 2018/0330614 | A1* | 11/2018 | Lin | H04W 4/021 |

(Continued)

FOREIGN PATENT DOCUMENTS

WO   WO 2017148202   9/2017

OTHER PUBLICATIONS

Alta, The Dockless Bike Share Revolution, Medium, Aug. 2017 (Year: 2017).*

(Continued)

*Primary Examiner* — Daniel Vetter
(74) *Attorney, Agent, or Firm* — Tutunjian & Bitetto, P.C.; Joseph Petrokaitis

(57) ABSTRACT

A computer-implemented method is provided for allocating a set of shared dockless bikes. The method includes providing a notification to a user of an availability prediction of a shared dockless bike, from among the set of shared dockless bikes, based on a trajectory of the shared dockless bike with respect to a current location of the user, and adding the user to a request queue associated with the current location of the user, responsive to the user agreeing to wait a specified time period for access to the shared dockless bike. The method further includes maintaining an available bikes queue for newly available shared dockless bikes, from among the shared dockless bikes, responsive to the newly available ones of the shared dockless bikes becoming available. The method also includes notifying users of the newly available shared dockless bikes in a priority order determined from the request queue.

17 Claims, 7 Drawing Sheets

(56) References Cited

U.S. PATENT DOCUMENTS

| | | | | |
|---|---|---|---|---|
| 2019/0019118 A1* | 1/2019 | Xi | ........................... | G06Q 10/04 |
| 2019/0051174 A1* | 2/2019 | Haque | .................... | G08G 1/202 |
| 2019/0057326 A1* | 2/2019 | Li | ........................... | G06Q 10/02 |
| 2019/0311629 A1* | 10/2019 | Sierra | ..................... | G06Q 10/02 |
| 2020/0058092 A1* | 2/2020 | Buttolo | .............. | G06Q 10/0834 |
| 2020/0410375 A1* | 12/2020 | Seagraves | .............. | G06Q 10/04 |

OTHER PUBLICATIONS

City of Olathe, Bike Share Implementation Strategy, Feb. 2018 (Year: 2018).*

Hillston et al., "Moment-based Probabilistic Prediction of Bike Availability for Bike-Sharing Systems", Proceedings for the 13th International Conference on Quantitative Evaluation of SysTems (QEST 2016), Aug. 2016, 17 pages.

Yang et al., "Mobility Modeling and Prediction in Bike-Sharing Systems", MobiSys'16, Jun. 2016, pp. 165-178.

* cited by examiner

DYNAMIC BOOKING SYSTEM FOR SHARED DOCKLESS BIKES USING TRAJECTORY POSITION

BACKGROUND

Technical Field

The present invention generally relates to vehicle management, and more particularly to a dynamic booking system for shared dockless bikes using trajectory position.

Description of the Related Art

Shared dockless bikes are quite popular in a number of locales, and are becoming increasingly popular elsewhere. To enable the use of shared dockless bikes, a system has been developed whereby a member can avoid returning a shared dockless bike to a kiosk by instead having the next user locate the shared dockless bike using GPS. The system shows only currently available shared dockless bikes which are locked and parked.

However, sometimes, especially during rush hours, people cannot find available shared dockless bikes nearby and may have to choose other ways to travel. Hence, there is a need for an improved approach for managing the use of shared dockless bikes.

SUMMARY

According to an aspect of the present invention, a computer-implemented method is provided for allocating a set of shared dockless bikes. The method includes providing a notification to a user of an availability prediction of a shared dockless bike, from among the set of shared dockless bikes, based on a trajectory of the shared dockless bike with respect to a current location of the user, and adding the user to a request queue associated with the current location of the user, responsive to the user agreeing to wait a specified time period for access to the shared dockless bike. The method further includes maintaining an available bikes queue for newly available shared dockless bikes, from among the shared dockless bikes, responsive to the newly available ones of the shared dockless bikes becoming available. The method also includes notifying users of the newly available shared dockless bikes in a priority order determined from the request queue.

According to another aspect of the present invention, a computer program product is provided for allocating a set of shared dockless bikes. The computer program product includes a non-transitory computer readable storage medium having program instructions embodied therewith. The program instructions are executable by a computer to cause the computer to perform a method. The method includes providing a notification to a user of an availability prediction of a shared dockless bike, from among the set of shared dockless bikes, based on a trajectory of the shared dockless bike with respect to a current location of the user, and adding the user to a request queue associated with the current location of the user, responsive to the user agreeing to wait a specified time period for access to the shared dockless bike. The method further includes maintaining an available bikes queue for newly available shared dockless bikes, from among the shared dockless bikes, responsive to the newly available ones of the shared dockless bikes becoming available. The method also includes notifying users of the newly available shared dockless bikes in a priority order determined from the request queue.

According to yet another aspect of the present invention, a computer processing system is provided for allocating a set of shared bikes. The computer processing system includes a request queue. The computer processing system further includes an available bikes queue. The computer processing system also includes a memory for storing program code. The computer processing system additionally includes a processing device for executing the program code to provide a notification to a user of an availability prediction of a shared bike, from among the set of shared bikes, based on a trajectory of the shared bike with respect to a current location of the user, and adding the user to the request queue associated with the current location of the user, responsive to the user agreeing to wait a specified time period for access to the shared bike. The processing device further executes the program code to maintain the available bikes queue for newly available shared bikes, from among the shared bikes, responsive to the newly available ones of the shared bikes becoming available. The processing device also executes the program code to notify users of the newly available bikes in a priority order determined from the request queue.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to a dynamic booking system for shared dockless bikes using trajectory position.

In an embodiment, the present invention provides an estimation of future availability of nearby shared dockless bikes to persuade a potential user to wait a short period of time (e.g., 5 minutes) for a newly available shared dockless bike. In an embodiment, a system and method are provided for users to pre-book shared dockless bikes which are currently being used by other users.

In an embodiment, a dynamic booking system books shared dockless bikes that can be currently moving towards a target location. If a shared dockless bike is parked and locked within a target location, a user listed on a waiting list will be notified using a priority basis. It is to be appreciated that once the pre-booked bikes become available in a region, they will have the status of "booked", only the user from the waiting list can take and use the bikes. If a candidate shared dockless bike moves out of the target location, it will be released from tracking. Hence, in an embodiment, tracking can be region based.

It is to be appreciated that in an embodiment, the user is not booking a specific shared dockless bike. Rather, the user is booking some member shared dockless bike that can be specified in a queue of upcoming available bikes. In an embodiment, the queue of upcoming available shared dockless bikes can be associated with a specific target location. Hence, there can be a queue of upcoming available shared dockless bikes for each location in a set of multiple target locations. In an embodiment, another queue can be used for booking requests.

Figure 1:
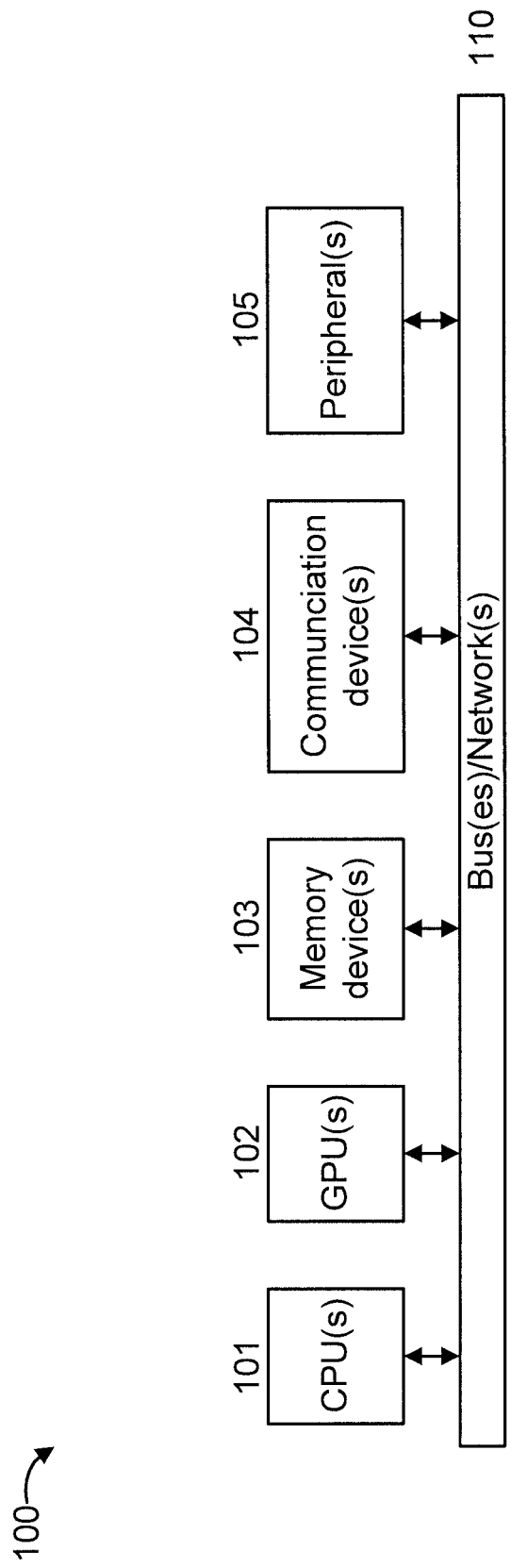
FIG. 1 is a block diagram showing an exemplary processing system to which the present invention may be applied, in accordance with an embodiment of the present invention.
Figure 5:
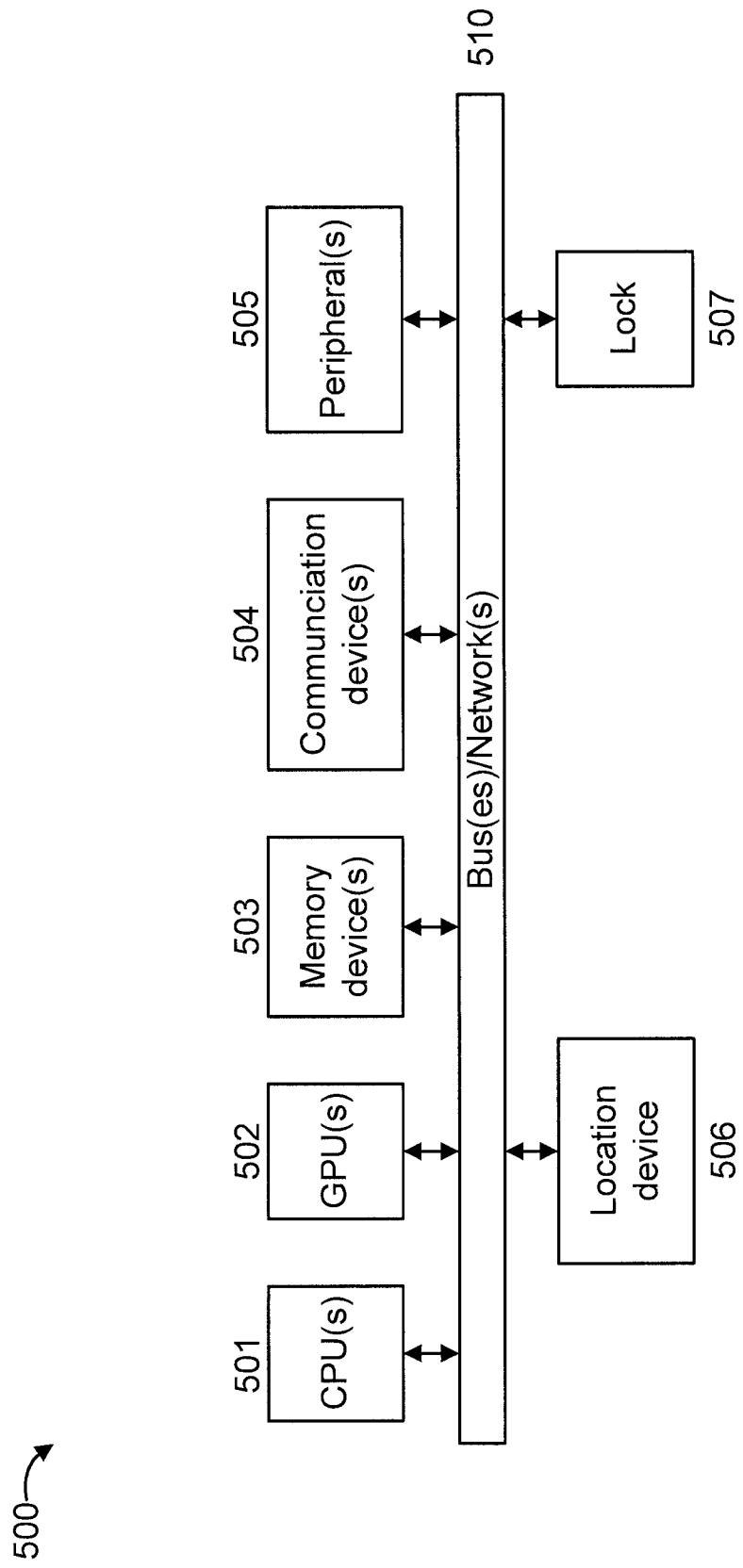
FIG. 5 is a block diagram showing another exemplary processing system to which the present invention may be applied, in accordance with an embodiment of the present invention.

FIGS. 1 and 5 hereinbelow describe respective exemplary processing systems 100 and 500 to which the present invention can be applied, in accordance with an embodiment of the present invention. In an embodiment, processing system 100 is used as a controlling processing system for managing a set of multiple shared bikes. In an embodiment, there can be a separate processing system 100 for each region in a set of multiple regions within which bike sharing occurs. In an embodiment, processing system 500 can be included in each of the shared dockless bikes, for use in providing positional information for each of the shared dockless bikes, lock/unlock the shared dockless bikes, and/or perform other functions depending upon the implementation.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). Any of the one or more memory devices 103 can be used to implement a request queue 191 and an available bikes queue 192, or one or more of the queues 191 and 192 can be implemented as separate memory devices, depending upon the implementation. The communication devices 104 can include wireless communication devices (e.g., network (e.g., WIFI, etc.) adapters, etc.). The peripherals 105 can include a display device, a user input device, a printer, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 6-7). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
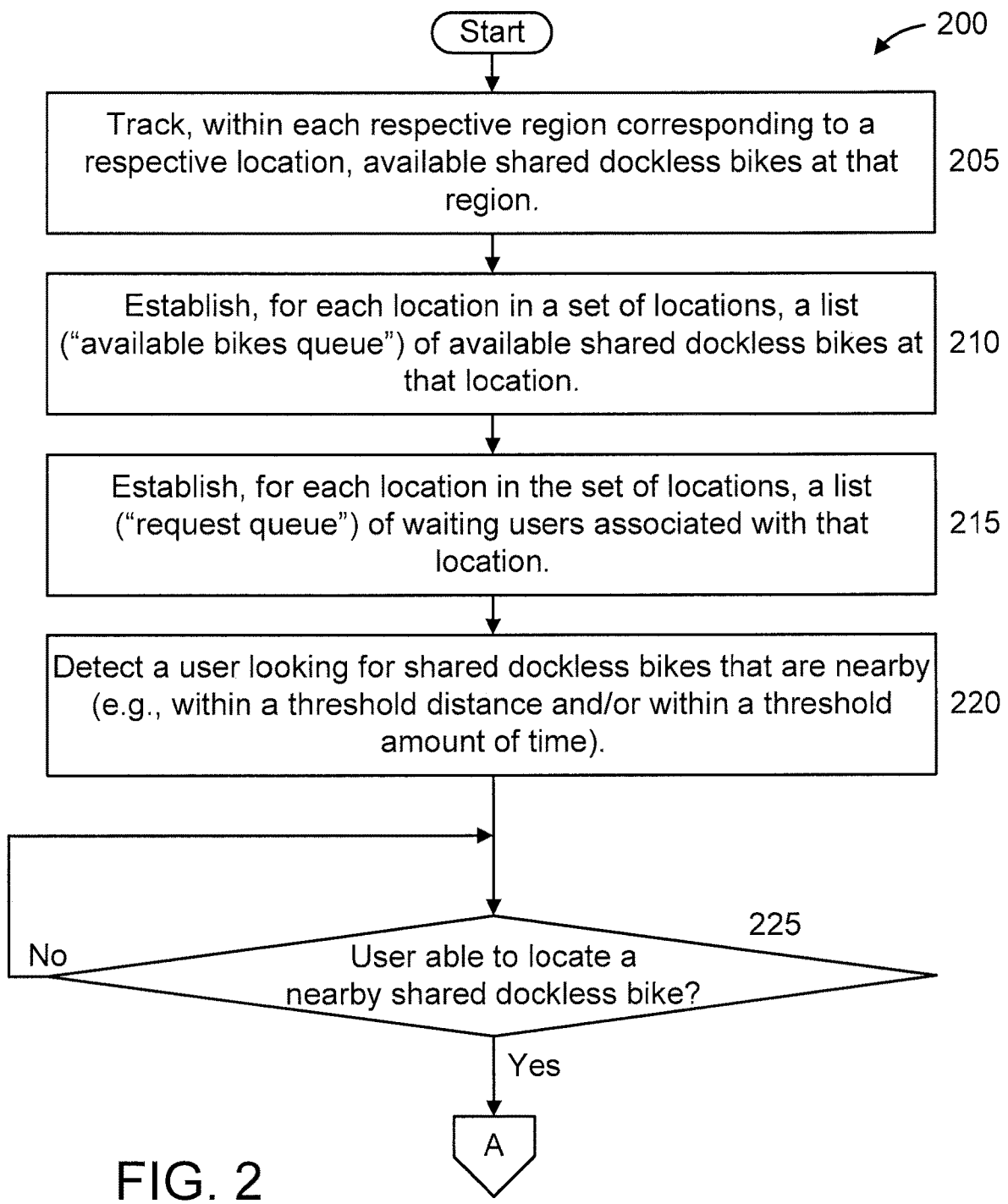
FIGS. 2-3 are flow diagrams showing an exemplary method for dynamic booking of shared dockless bikes with trajectory prediction, in accordance with an embodiment of the present invention.
Figure 3:
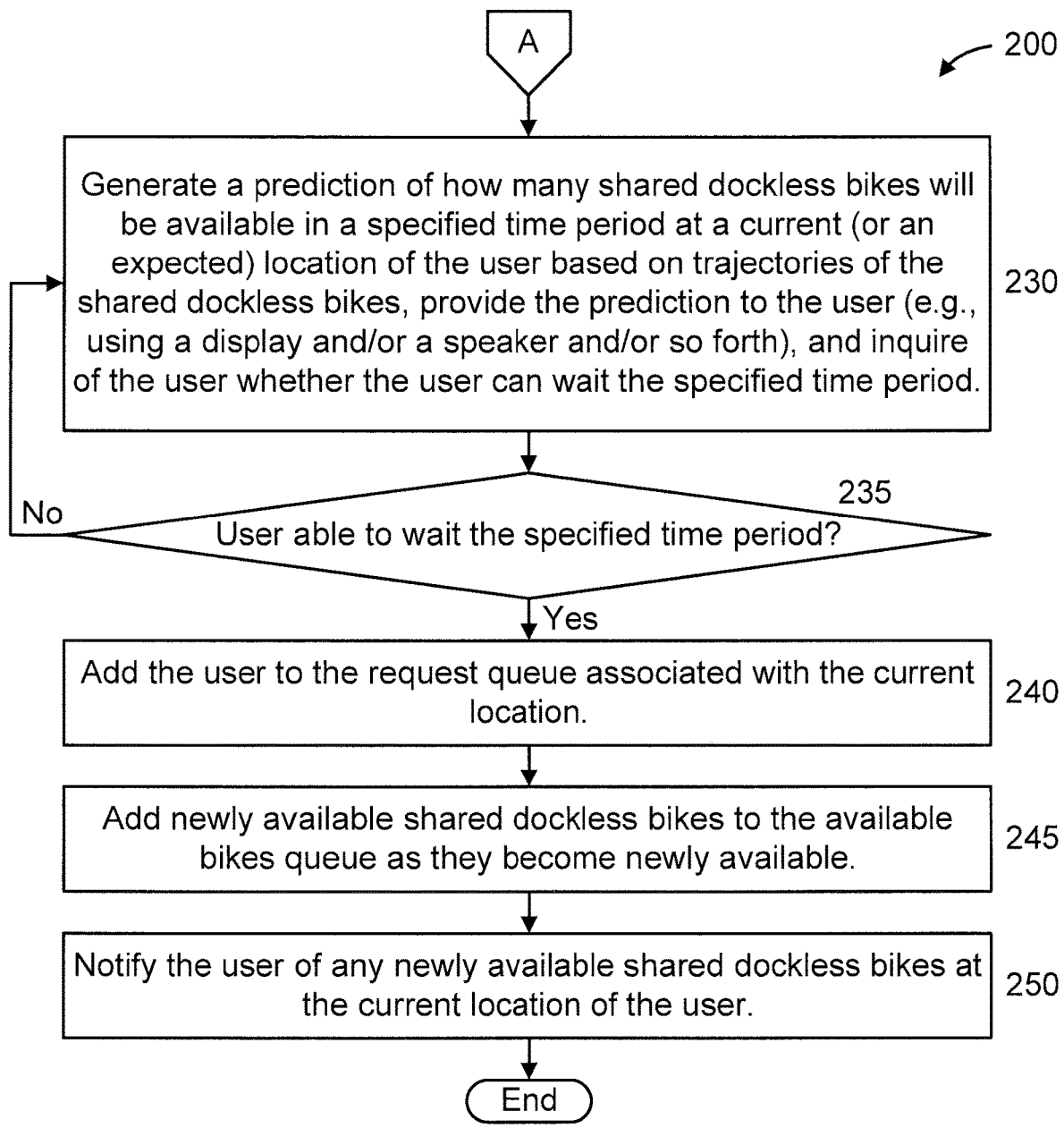

FIGS. 2-3 are flow diagrams showing an exemplary method 200 for dynamic booking of shared dockless bikes with trajectory prediction, in accordance with an embodiment of the present invention.

At block 205, track, within each respective region corresponding to a respective location, available shared dockless bikes at that region. It is to be appreciated that while shown as an initial block, performance of block 205 persists during method 300 in order to enable method 300.

At block 210, establish, for each location in a set of locations, a list of available shared dockless bikes at that location. This list is also known, and hereinafter referred to, as the "available bikes queue". Thus, each location will have a respective available bikes queue associated therewith.

At block 215, establish, for each location in the set of locations, a list of waiting users associated with that location. This list is also known, and hereinafter referred to, as the "request queue". Thus, each location will have a respective request queue associated therewith. Hence, the request queues can be considered to be location-based request queues.

At block 220, detect a user looking for shared dockless bikes that are nearby (e.g., within a threshold distance and/or within a threshold amount of time).

At block 225, determine whether the user was able to locate a nearby shared dockless bike. If so, then proceed to block 230. Otherwise, return to block 225.

At block 230, generate a prediction of how many shared dockless bikes will be available in a specified time period at a current (or an expected) location of the user based on trajectories of the shared dockless bikes, provide the prediction to the user (e.g., using a display and/or a speaker and/or so forth), and inquire of the user whether the user can wait the specified time period. In an embodiment, the size of the request queue is selected based on the specified time period, among other considerations.

At block 235, determine whether a result of the inquiry of block 230 is affirmative or non-affirmative. If affirmative, then proceed to block 240. Otherwise, return to block 230.

At block 240, add the user to the request queue associated with the current location.

At block 245, add newly available shared dockless bikes to the available bikes queue as they become newly available. As appreciated by one of ordinary skill in the art, given the teachings of the present invention herein, the term "newly available" can mean parked in an embodiment, parked and locked in another embodiment, and so forth, depending upon the implementation.

At block 250, notify the user of any newly available shared dockless bikes at the current location of the user. The user can be notified in a visual (using a display), and/or audible (using a speaker) and/or tactile (using a vibration device) manner that a shared dockless bike is available for them at their current location. In order to aid the user in locating the shared dockless bike, the notification can be provided to the user and/or can be provided by the shared dockless bike itself. In an embodiment, block 250 can include provide information to a user indicative of their place in line. For example, in an embodiment, a user can be provided with the following message: "In 5 minutes, there will be 3 bikes available, 1 user was ahead of you". Of course, other formats can be used.

Further regarding block 230, in an embodiment, trajectory related information can be used that includes, for example, but is not limited to, destination, direction, speed, acceleration parameters (e.g., rate (+distance/time, etc.)), de-acceleration parameters (e.g., rate (–distance/time, etc.)), known obstacles, predicted obstacles, typical user rate, particular user rate, and/or so forth. Absolute values can be used in place of signed (+, –) values. Moreover, averages, normalizations, and so forth can be used. Of course, other trajectory related information, and/or non-trajectory, travel and/or bike related information, can be used, while maintaining the spirit of the present invention. For example, in an embodiment, weather, bike type, bike make and/or model, performance level, and/or so forth can be considered in generating a prediction. Moreover, various weights can be assigned to the preceding in order to more generate a more accurate prediction. Also, various mathematical approaches including the use of a statistical method(s) applied to multiple historical trajectories can be used, while maintaining the spirit of the present invention. In an embodiment, the present invention can involve evaluating multiple current trajectories of current users heading to a target location relative to a user needing a bike with respect to historical trajectories in order to generate an availability prediction for the user.

Also further regarding block 230, in an embodiment, artificial intelligence including but not limited to, learning-based techniques, can be used in prediction generation per block 230. In this way, prediction accuracy can be improved over time as the system learns the specifics of each location and how it's specific parameters affect prediction error and so forth.

Regarding method 200 in general, a cloud-based approach can be used. In an embodiment, a cloud-based shared dockless bike allocation service can be used that includes a set of computing nodes, where each of the computing nodes is associated with a corresponding target region (having one or more target locations therein at which a bike park, take, or exchange can occur). In an embodiment, shared dockless bike supervision (e.g., tracking) and corresponding prediction generation can be performed using a location-based approach such that the active node performing these functions (supervision, prediction generation, etc.) for a given shared dockless bike at a given time is the computing node closest (or next closest (and so on) if the first (and so on) is beyond a threshold computing and/or storage and/or bike management limit) to the given shared dockless bike at the given time, considering that different computing nodes can be implicated as the shared dockless bikes move in their trajectories. The preceding and other cloud configurations are readily contemplated by one of ordinary skill in the art given the teachings of the present invention provided herein, while maintaining the spirit of the present invention.

The aforementioned queues can each be implemented using specialized and/or dedicated memories. Also, a specially programmed (e.g., ASIC, etc.) coordinator can be used, for example, to fetch shared dockless bikes from the available bikes queue and provide a user notification function (per block 250). In fact, in an embodiment, method 200 can be implemented using a shared dockless bike booking system implemented by at least an ASIC. In an embodiment, one or more cloud configurations can be used. These and other configurations of the present invention are readily determined by one of ordinary skill in the art, given the teachings of the present invention provided herein, while maintaining the spirit of the present invention.

The data stored in the request queue and/or the available bikes queue can be updated randomly, periodically, differently, and so forth. In an embodiment, certain events can also cause an automatic update, such as changing a status of a shared dockless bike from (moving to non-moving) or from (non-moving to moving), entering and/or exiting a different supervised region, and so forth. The preceding and other events are readily contemplated by one of ordinary skill in the art, given the teachings of the present invention provided herein, while maintaining the spirit of the present invention.

Figure 4:
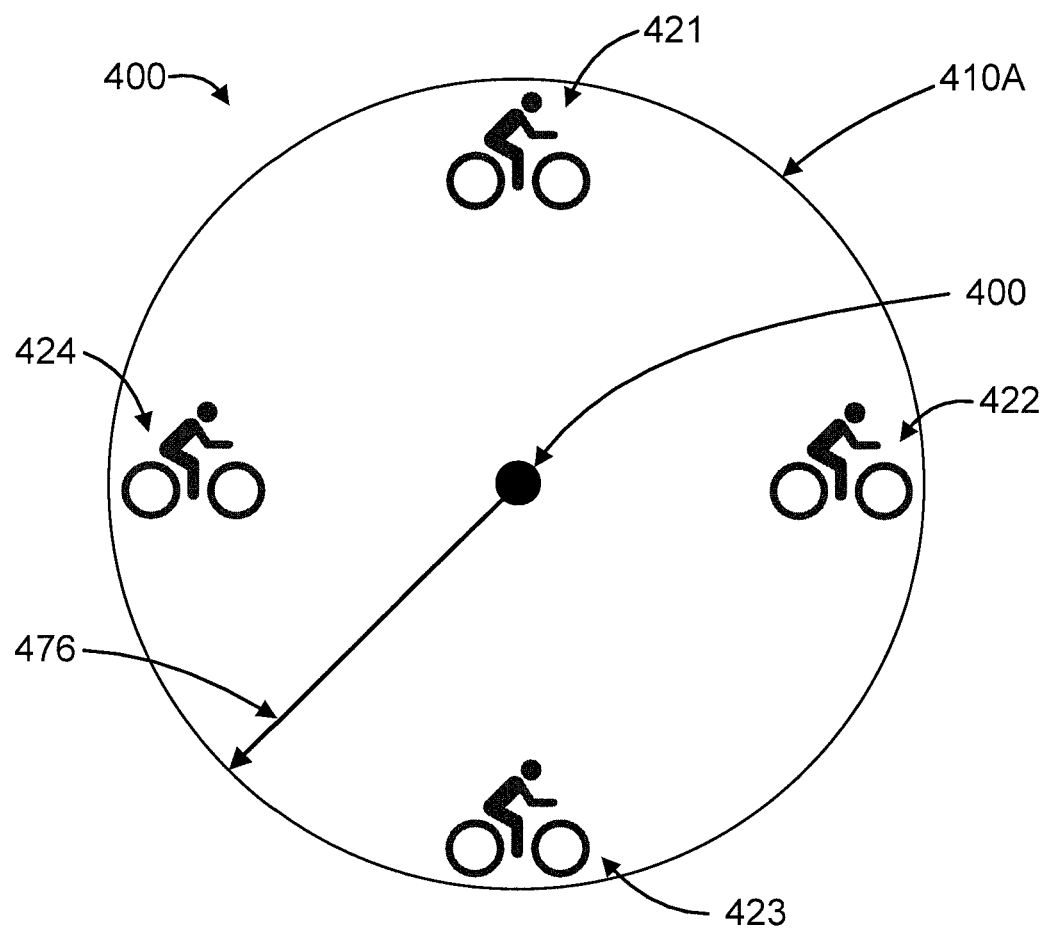
FIG. 4 is a block diagram showing an exemplary target location to which the present invention can be applied, in accordance with man embodiment of the present invention.

FIG. 4 is a block diagram showing an exemplary target location 400 to which the present invention can be applied, in accordance with man embodiment of the present invention. In an embodiment, the present invention is configured to monitor a substantially circular (or other-shaped) region 410 around the target location 400. Multiple shared dockless bikes 421, 422, 423, and 424 can be concurrently present, and tracked while, in the region 410 encompassing target location 400.

The region 410 can be considered to include a periphery 410A. In the case of multiple regions (e.g., with each associated with a different respective available bikes queue in a configuration employing (multiple) location-based available bikes queues, with possible overlap to avoid dead zones), each of the regions can be constrained by a respective outer periphery corresponding to a maximum time distance 476 (e.g., 5 minutes) from the target location 400 to the outer-periphery 410A (in the case where, for example, the regions are circular in shape, noting that other shapes can be used). The same or different time distances (and, hence, overall area sizes) can be used for each region, depending upon the implementation (e.g., terrain, etc.).

It is to be appreciated that a user of the system attempting to secure a turn on a shared dockless bike is not booking a specific shared dockless bike but rather a location in a queue (i.e., the request queue) from which shared dockless bikes are allocated in priority order (that is, in the order of receipt). This is because predictions can differ due to differences between predicted and actual arrival times. A learning-based prediction approach can learn from the errors between the predicted and actual arrival times and minimize the errors over time.

FIG. 5 is a block diagram showing another exemplary processing system 500 to which the present invention may be applied, in accordance with an embodiment of the present invention. The processing system 500 includes a set of processing units (e.g., CPUs) 501, a set of GPUs 502, a set of memory devices 503, a set of communication devices 504, a set of peripherals 505, a location device 506, and a lock 507. The CPUs 501 can be single or multi-core CPUs. The GPUs 502 can be single or multi-core GPUs. The one or more memory devices 503 can include caches, RAMs, ROMs, and other memories (flash, optical, magnetic, etc.). The communication devices 504 can include wireless communication devices (e.g., network (e.g., WIFI, etc.) adapters, etc.). The peripherals 505 can include a display device, a user input device, a printer, and so forth. The location device 506 can be, for example, a device that uses the Global Satellite Positioning (GPS) system to determine location. The lock 507 can be a physical and/or electronic lock for locking the shared dockless bike and/or otherwise rendering the shared dockless bike unusable/unridable. In an embodiment, the lock 507, as well as other elements of system 500, can be interfaced with by an application program resident on a smart phone of the user, or directly accessible via a keypad or other user interface device.

Elements of processing system 500 are connected by one or more buses or networks (collectively denoted by the figure reference numeral 510).

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present invention provided herein.

Moreover, it is to be appreciated that various figures as described above with respect to various elements and steps relating to the present invention that may be implemented, in whole or in part, by one or more of the elements of system 500.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
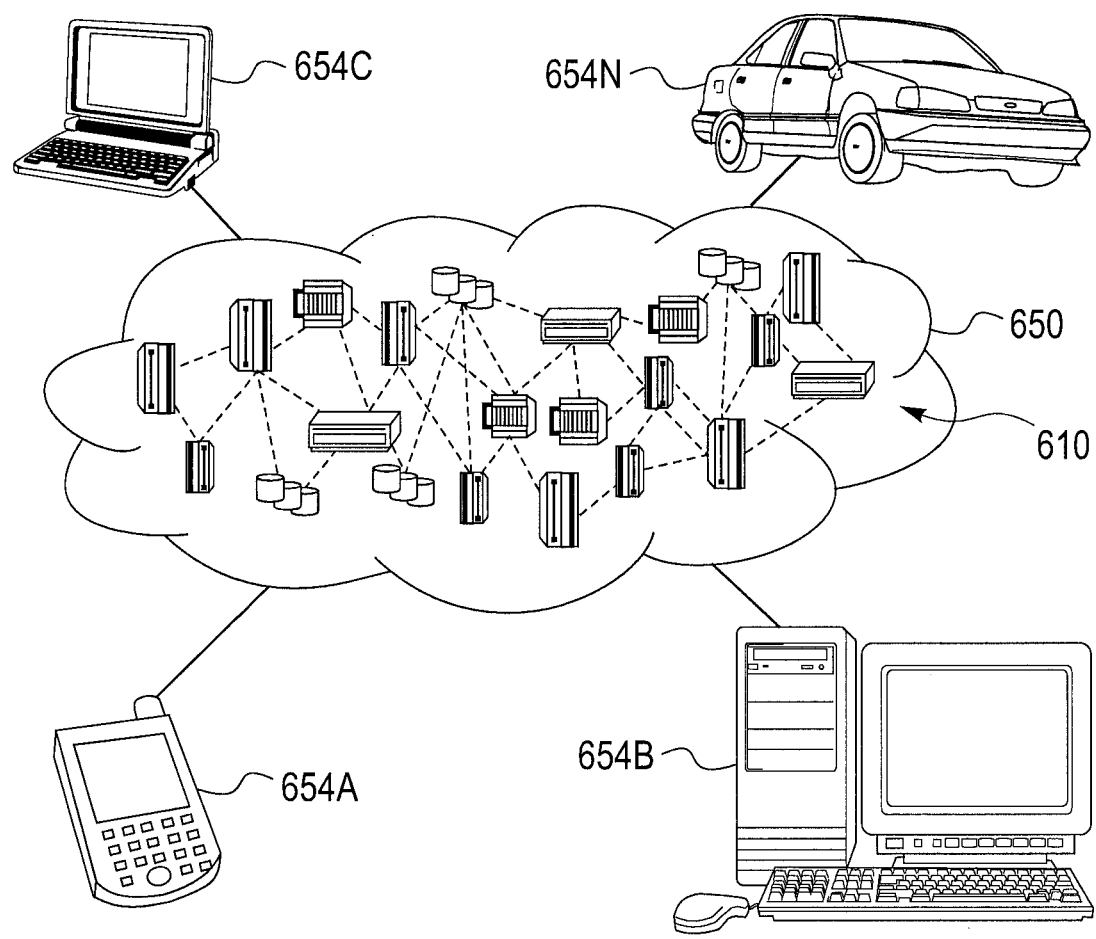
FIG. 6 is a block diagram showing an illustrative cloud computing environment having one or more cloud computing nodes with which local computing devices used by cloud consumers communicate in accordance with one embodiment.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
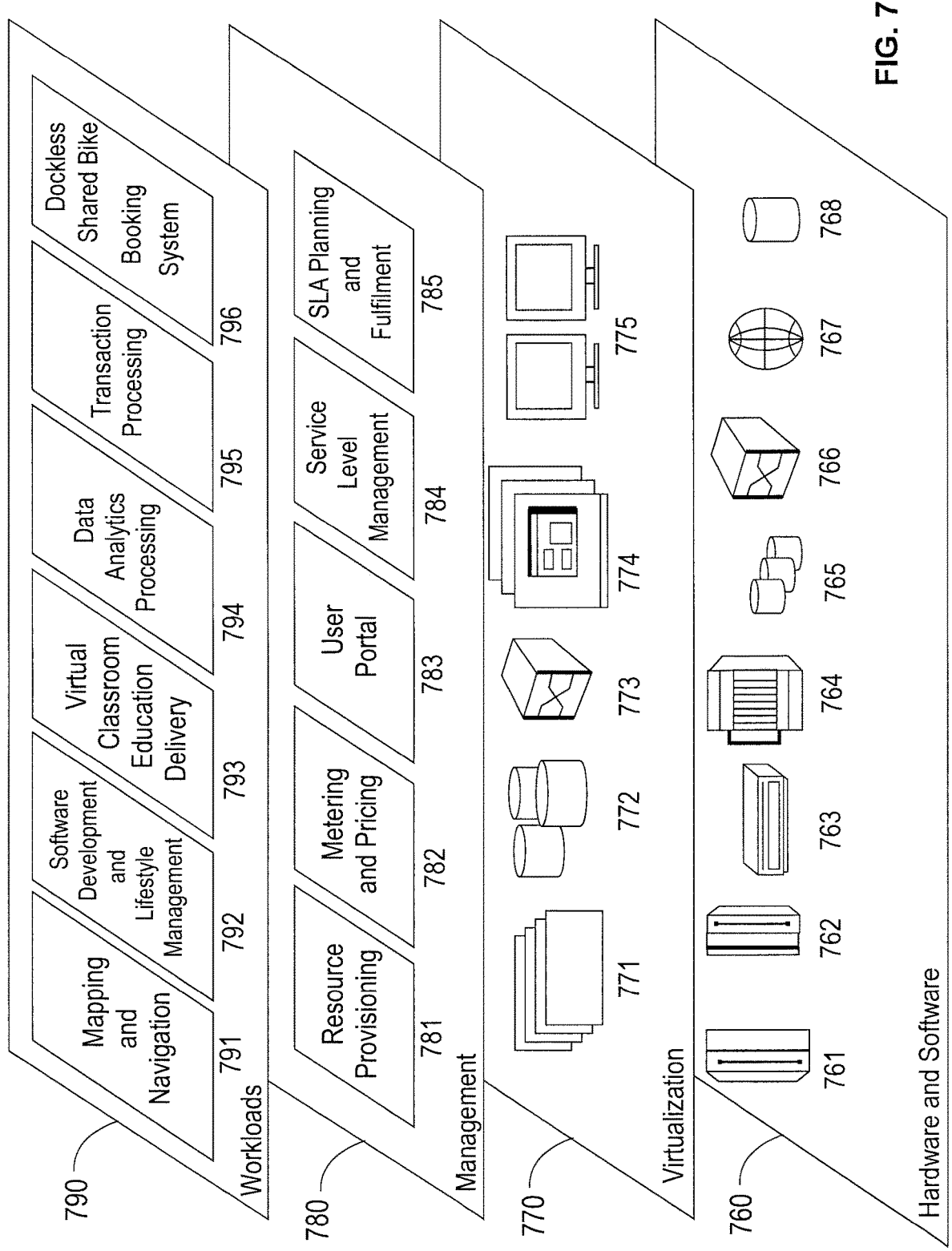
FIG. 7 is a block diagram showing a set of functional abstraction layers provided by a cloud computing environment in accordance with one embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and dynamic booking system for shared bikes using trajectory information 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for allocating a set of shared dockless bikes, comprising:
providing a notification to a user of an availability prediction of a shared dockless bike, from among the set of shared dockless bikes, based on a trajectory of the shared dockless bike with respect to a current location of the user determined by a GPS device, and adding the user to a request queue associated with the current location of the user, responsive to the user agreeing to wait a specified time period for access to the shared dockless bike;
maintaining an available bikes queue for newly available shared dockless bikes, from among the shared dockless bikes, responsive to the newly available ones of the shared dockless bikes becoming available; and
notifying users of the newly available shared dockless bikes in a priority order determined from the request queue,
wherein the shared dockless bikes are tracked, on a regional basis, within a plurality of regions that encompass exchange locations of the shared dockless bikes, wherein tracking for a given region commences when the shared dockless bikes enter the given region and is terminated when the shared dockless bikes leave the given region, wherein an electronic lock locks or unlocks the shared dockless bikes by interfacing with an application program resident on a smart phone of the user, and wherein the computer processing system forms computing nodes in a cloud computing configuration that assigns a respective one of multiple available bikes queues to each of a plurality of different regions, each of the different regions encompassing exchange locations of the shared bikes, such that a closest one of the computing nodes to a newly available shared bike is used to execute the program code to process the newly available shared bike.

2. The computer-implemented method of claim 1, wherein the available bikes queue is comprised in a set of available bikes queues, each of the available bikes queues in the set associated with a respective different one of the plurality of regions, and wherein the shared dockless bikes entering the given region are added to a particular one of the available bikes queue that is region specific for the given region from among the plurality of available bikes queues.

3. The computer-implemented method of claim 1, wherein each of the regions is constrained by a respective outer periphery corresponding to a maximum time distance from the respective outer-periphery to a respective target location therein.

4. The computer-implemented method of claim 1, wherein the available bikes queue is comprised in a set of available bikes queues, each of the available bikes queues in the set associated with a respective different one of the plurality of regions, and wherein the shared dockless bikes leaving the given region are removed from a particular one of the available bikes queue that is region specific for the given region from among the plurality of available bikes queues.

5. The computer-implemented method of claim 1, further comprising notifying a next available one of the users of a given one of the newly available shared dockless bikes, responsive to a user having a higher priority declining to access the given one of the newly available shared dockless bikes.

6. The computer-implemented method of claim 1, wherein the method allocates the set of shared dockless bikes across a plurality of locations, and wherein a respective different one of a plurality of request queues is associated with a respective different one of the plurality of locations to provide a plurality of location-based request queues.

7. The computer-implemented method of claim 1, wherein the availability prediction is generated using trajectory related information selected from the group consisting of destination, direction, speed, acceleration parameters, de-acceleration parameters, known obstacles, predicted obstacles, typical user rate, and particular user rate.

8. The computer-implemented method of claim 1, wherein the availability prediction is generated further using non-trajectory, travel related information.

9. The computer-implemented method of claim 1, wherein the availability prediction is generated further using bike related information selected from the group consisting of a bike type, a bike make, a bike model, and a bike performance level.

10. The computer-implemented method of claim 1, wherein the availability prediction is generated using a statistical method applied to multiple historical trajectories.

11. A computer program product for allocating a set of shared dockless bikes, the computer program product comprising a non-transitory computer readable storage medium having program instructions embodied therewith, the program instructions executable by a computer to cause the computer to perform a method comprising:
providing a notification to a user of an availability prediction of a shared dockless bike, from among the set of shared dockless bikes, based on a trajectory of the shared dockless bike with respect to a current location of the user determined by a GPS device, and adding the user to a request queue associated with the current location of the user, responsive to the user agreeing to wait a specified time period for access to the shared dockless bike;
maintaining an available bikes queue for newly available shared dockless bikes, from among the shared dockless bikes, responsive to the newly available ones of the shared dockless bikes becoming available; and
notifying users of the newly available shared dockless bikes in a priority order determined from the request queue,
wherein the shared dockless bikes are tracked, on a regional basis, within a plurality of regions that encompass exchange locations of the shared dockless bikes, wherein tracking for a given region commences when the shared dockless bikes enter the given region and is terminated when the shared dockless bikes leave the given region, wherein an electronic lock locks or unlocks the shared dockless bikes by interfacing with an application program resident on a smart phone of the user, and wherein the computer processing system forms computing nodes in a cloud computing configuration that assigns a respective one of multiple available bikes queues to each of a plurality of different regions, each of the different regions encompassing exchange locations of the shared bikes, such that a closest one of the computing nodes to a newly available shared bike is used to execute the program code to process the newly available shared bike.

12. The computer program product of claim 11, wherein the available bikes queue is comprised in a set of available bikes queues, each of the available bikes queues in the set associated with a respective different one of the plurality of regions, and wherein the shared dockless bikes entering the given region are added to a particular one of the available bikes queue that is region specific for the given region from among the plurality of available bikes queues.

13. The computer program product of claim 11, wherein each of the regions is constrained by a respective outer periphery corresponding to a maximum time distance from the respective outer-periphery to a respective target location therein.

14. The computer program product of claim 11, wherein the available bikes queue is comprised in a set of available bikes queues, each of the available bikes queues in the set associated with a respective different one of the plurality of regions, and wherein the shared dockless bikes leaving the given region are removed from a particular one of the available bikes queue that is region specific for the given region from among the plurality of available bikes queues.

15. The computer program product of claim 11, wherein the method further comprises notifying a next available one of the users of a given one of the newly available shared dockless bikes, responsive to a user having a higher priority declining to access the given one of the newly available shared dockless bikes.

16. The computer program product of claim 11, wherein the method allocates the set of shared dockless bikes across a plurality of locations, and wherein a respective different one of a plurality of request queues is associated with a respective different one of the plurality of locations to provide a plurality of location-based request queues.

17. A computer processing system for allocating a set of shared bikes, comprising:
a request queue;
an available bikes queue;
a memory for storing program code; and
a processing device for executing the program code to provide a notification to a user of an availability prediction of a shared bike, from among the set of shared bikes, based on a trajectory of the shared bike with respect to a current location of the user determined by a GPS device, and adding the user to the request queue associated with the current location of the user, responsive to the user agreeing to wait a specified time period for access to the shared bike;

maintain the available bikes queue for newly available shared bikes, from among the shared bikes, responsive to the newly available ones of the shared bikes becoming available; and notify users of the newly available bikes in a priority order determined from the request queue, wherein the shared dockless bikes are tracked by the processor device, on a regional basis, within a plurality of regions that encompass exchange locations of the shared dockless bikes, wherein tracking for a given region commences when the shared dockless bikes enter the given region and is terminated when the shared dockless bikes leave the given region and wherein the computer processing system forms computing nodes in a cloud computing configuration that assigns a respective one of multiple available bikes queues to each of a plurality of different regions, each of the different regions encompassing exchange locations of the shared bikes, such that a closest one of the computing nodes to a newly available shared bike is used to execute the program code to process the newly available shared bike an electronic lock for locking or unlocking the shared dockless bikes by interfacing with an application program resident on a smart phone of the user.

* * * * *